United States Patent
Fabre

(10) Patent No.: US 9,017,028 B2
(45) Date of Patent: Apr. 28, 2015

(54) TURBINE ENGINE WITH CONTRA-ROTATING NON-DUCTED PROPELLERS

(75) Inventor: Adrien Jacques Philippe Fabre, Montrouge (FR)

(73) Assignee: Snecma, Paris (FR)

( * ) Notice: Subject to any disclaimer, the term of this patent is extended or adjusted under 35 U.S.C. 154(b) by 510 days.

(21) Appl. No.: 13/496,647

(22) PCT Filed: Sep. 2, 2010

(86) PCT No.: PCT/FR2010/051830
§ 371 (c)(1),
(2), (4) Date: Mar. 16, 2012

(87) PCT Pub. No.: WO2011/033204
PCT Pub. Date: Mar. 24, 2011

(65) Prior Publication Data
US 2012/0177493 A1    Jul. 12, 2012

(30) Foreign Application Priority Data

Sep. 18, 2009 (FR) ...................... 09 04471

(51) Int. Cl.
*B64C 11/48* (2006.01)
*F02K 3/062* (2006.01)
*F01D 1/26* (2006.01)
(Continued)

(52) U.S. Cl.
CPC ................ *F02K 3/062* (2013.01); *B64C 11/48* (2013.01); *B64D 2027/026* (2013.01); *F01D 1/26* (2013.01); *F02C 3/10* (2013.01); *F02C 7/36* (2013.01); *F02K 3/072* (2013.01); *Y02T 50/66* (2013.01); *Y02T 50/671* (2013.01); *F05D 2220/325* (2013.01); *F05D 2220/324* (2013.01);
(Continued)

(58) Field of Classification Search
CPC ........ B64C 11/48; B63H 5/10; F01D 25/164; F03D 1/025; F05B 2240/40
USPC ................ 416/129, 120, 124, 128; 415/124.1
See application file for complete search history.

(56) References Cited

U.S. PATENT DOCUMENTS 3,669,564 A * 6/1972 Garfinkle ....................... 416/121
4,817,382 A * 4/1989 Rudolph et al. ................ 60/268
(Continued)

FOREIGN PATENT DOCUMENTS

FR    2 620 107         3/1989
GB    2 169 968 A       7/1986

OTHER PUBLICATIONS

International Search Report issued Feb. 2, 2011 in Application No. PCT/FR2010/051830.
Hoeveler Patrick, "Zurück in die Zukunft—CFM beginnt Open-Rotor-Tests", Flug Revue, Vereinigte Motor-Verlage GMBH & Co., XP007908159, Mar. 1, 2009, pp. 82-85.

*Primary Examiner* — Edward Look
*Assistant Examiner* — Aaron R Eastman
(74) *Attorney, Agent, or Firm* — Oblon, McClelland, Maier & Neustadt, L.L.P.

(57) ABSTRACT

A turbine engine including two contrarotating unducted propellers of an upstream propeller and a downstream propeller, with a power turbine mounted axially between the two propellers, the turbine including an outer rotor constrained to rotate with the upstream propeller and an inner rotor driving rotation of an inlet shaft of a step-down gearbox, the gearbox includes an outlet shaft driving rotation of the rotor of the upstream propeller and an outlet shaft driving rotation of the downstream propeller.

6 Claims, 1 Drawing Sheet

(51) Int. Cl.
*F02C 3/10* (2006.01)
*F02C 7/36* (2006.01)
*F02K 3/072* (2006.01)
*B64C 11/30* (2006.01)
*B64D 27/02* (2006.01)
*B64D 27/00* (2006.01)

(52) U.S. Cl.
CPC ......... *B64C 11/308* (2013.01); *B64D 2027/005* (2013.01)

(56) References Cited

U.S. PATENT DOCUMENTS

| | | | | |
|---|---|---|---|---|
| 4,964,844 | A | | 10/1990 | Bagnall |
| 4,976,102 | A | * | 12/1990 | Taylor .......................... 60/226.1 |
| 5,054,998 | A | * | 10/1991 | Davenport ........................ 416/1 |
| 5,079,916 | A | * | 1/1992 | Johnson .......................... 60/268 |
| 5,152,668 | A | * | 10/1992 | Bulman et al. ................. 416/129 |
| 5,154,580 | A | * | 10/1992 | Hora ............................. 416/129 |
| 5,263,898 | A | * | 11/1993 | Elston et al. ................... 416/147 |

\* cited by examiner

TURBINE ENGINE WITH CONTRA-ROTATING NON-DUCTED PROPELLERS

BACKGROUND OF THE INVENTION

1. Field of the Invention

The invention relates to a turbine engine having two unducted (or "open rotor") contrarotating propellers, namely an upstream propeller and a downstream propeller.

2. Description of the Related Art

In conventional manner, such a turbine engine has two contrarotating propellers on a common axis, respectively an upstream propeller and a downstream propeller, which propellers extend radially outside the nacelle of the turbine engine. These two propellers are driven in rotation by a power turbine arranged at the outlet from a combustion chamber, and they are axially spaced apart from each other by some minimum distance in order to limit sound emissions.

In a known architecture, the contrarotating propellers are mounted axially downstream from the power turbine, which has a plurality of moving blades arranged axially in alternation with stationary vanes carried by a casing of the turbine engine. The rotor of the power turbine is driven in rotation by the combustion gas and it is connected to an inlet shaft of a step-down gearbox having two contrarotating outlet shafts, each driving a respective one of the upstream and downstream propellers in opposite directions. Such a step-down gearbox is described in document U.S. Pat. No. 4,997,414.

That configuration enables the power turbine to operate at a high speed for which its efficiency is at a maximum with a small number of stages, e.g. three stages. Furthermore, the contrarotating propellers are capable of rotating at a speed that is slower than the rotor of the power turbine, because of the incorporated step-down gearbox, thereby limiting sound emission from the propellers in operation.

Nevertheless, the minimum axial spacing that needs to be complied with between the contrarotating propellers, and the way they are arranged downstream from the power turbine impose an increase in axial length of the turbine engine, leading to the two contrarotating propellers being cantilevered out on the downstream portion of the turbine engine. This is conventionally compensated by reinforcing the structures for supporting the upstream and downstream propellers, thereby increasing the weight of the turbine engine and thus its fuel consumption.

In another type of architecture, the power turbine is mounted between the upstream and downstream propellers and has two contrarotating rotors, an inner rotor and an outer rotor, each having a plurality of rows of blades arranged axially in alternation with one another. The inner and outer rotors are connected directly to the upstream and downstream propellers, respectively.

Direct mechanical drive of the upstream and downstream propellers by the inner and outer rotors respectively of the power turbine prevents good efficiency being obtained in the power turbine while using only a small number of blade stages, as is possible in the above-described architecture using a step-down gearbox, given that the speeds of rotation of the upstream and downstream propellers must be sufficiently slow to avoid generating high levels of sound nuisance.

In order to use such a turbine engine, it is necessary to increase the number of stages in the power turbine up to eight or even ten stages, thereby complicating assembly of the turbine engine and increasing its cost.

BRIEF SUMMARY OF THE INVENTION

A particular object of the invention is to provide a solution to those problems of the prior art that is simple, effective, and inexpensive.

To this end, the invention provides a turbine engine having two contrarotating unducted propellers, an upstream propeller and a downstream propeller, the engine comprising a power turbine connected via a step-down gearbox to the rotors of the propellers, the engine being characterized in that the power turbine is mounted axially between the two propellers and comprises an outer rotor constrained to rotate with the upstream propeller, and an inner rotor driving rotation of an inlet shaft of the gearbox, the gearbox having an outlet shaft driving rotation of the rotor of the upstream propeller and an outlet shaft driving rotation of the downstream propeller.

Arranging the power turbine between the two contrarotating propellers, i.e. the upstream propeller and the downstream propeller, makes it possible to reduce the axial size of the turbine engine, thereby limiting the cantilevering out of the contrarotating propellers and the dynamic loading on the entire stationary structure of the turbine engine in the event of any unbalance.

The power turbine no longer drives either of the upstream or downstream propellers, and it can therefore rotate at a high speed compatible with obtaining good efficiency for the power turbine with a small number of stages.

The upstream and downstream propellers are driven in rotation in opposite directions by outlet shafts from a step-down gearbox, thereby enabling the propellers to rotate at a speed that is sufficiently slow for limiting sound emissions.

Compared with a prior art power turbine as described above, in which the rotor is connected to a step-down gearbox, the invention enables equivalent efficiency to be obtained but with an inner rotor that is rotating comparatively more slowly because of the presence of a contrarotating outer rotor. The mechanical strength of the inner rotor is thus improved and it is possible to reduce its weight. In similar manner, the mechanical design of the outer rotor is made easier because it is constrained to rotate with the upstream propeller.

The invention thus makes it possible to have a turbine engine that is axially compact, with good efficiency for its power turbine, while having upstream and downstream propellers that generate little sound nuisance, thereby making it possible to combine the advantages of the two above-described known types of turbine engine having contrarotating propellers, while avoiding their drawbacks.

According to another characteristic of the invention, the gearbox is mounted axially upstream from the upstream propeller in order to further reduce the axial size of the turbine engine.

Advantageously, the power turbine comprises three stages in series, each formed by an annular row of blades carried by the inner rotor and an annular row of blades carried by the outer rotor.

It is thus possible to obtain good efficiency with a small number of blade stages because the inner rotor rotates at high speed. This small number of blade stages improves the mechanical behavior of the rotary parts and in particular of the outer rotor and simplifies fabrication of the turbine engine.

BRIEF DESCRIPTION OF THE SEVERAL VIEWS OF THE DRAWINGS

The invention can be better understood and other details, advantages, and characteristics of the invention of the invention appear on reading the following description made by way of non-limiting example and with reference to the accompanying drawing, in which.

DETAILED DESCRIPTION OF THE INVENTION

Figure 1:
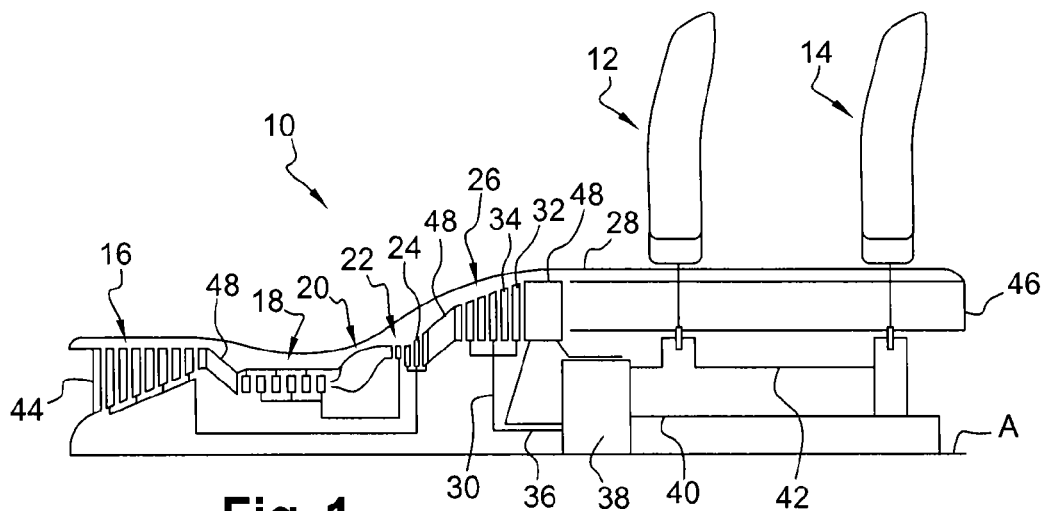
FIG. 1 is a diagrammatic axial section view of a turbine engine of the prior art having two contrarotating propellers.
Figure 2:
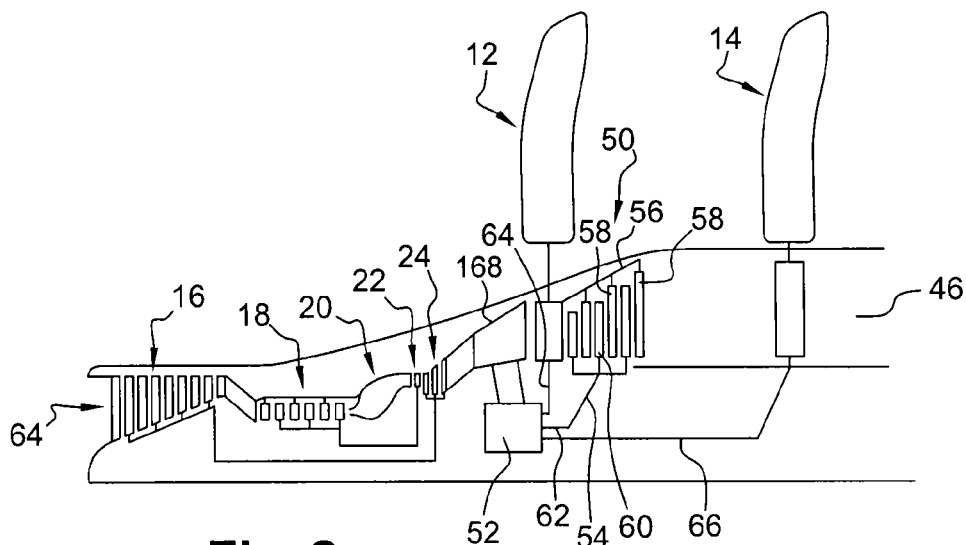
FIG. 2 is a diagrammatic view of a turbine engine of the invention having two contrarotating propellers.

Reference is made initially to FIG. 1 which shows a turbine engine 10 having contrarotating unducted propellers 12 and 14 and comprising from upstream to downstream in the flow direction of gas through the turbine engine: a low-pressure compressor 16; a high-pressure compressor 18; an annular combustion chamber 20; a high-pressure turbine 22 imparting rotary drive to the high-pressure compressor 18; an intermediate pressure turbine 24 driving the low-pressure turbine 16; and then a low-pressure power turbine 26 driving the contrarotating propellers 12 and 14.

The power turbine 26 is arranged upstream from the two contrarotating propellers 12 and 14, and they extend radially on the outside of the nacelle 28 of the turbine engine, the nacelle 28 being substantially cylindrical and extending along the axis of rotation A around the compressors 16 and 18, the combustion chamber 20, and the turbines 22, 24, and 26. The rotor 30 of the power turbine 26 has a plurality of rows of moving blades 32 arranged in alternation with rows of stationary vanes 34 secured to a casing of the turbine engine. The rotor 30 is connected to the inlet shaft 36 of a step-down gearbox 38 having two outlet shafts 40 and 42, each driving a respective one of the upstream and downstream propellers 12 and 14 in opposite directions.

In operation, the stream of air 44 that penetrates into the turbine engine is compressed and then mixed with fuel and burnt in the combustion chamber 20, the combustion gas then passing through the high-pressure and intermediate turbines 22 and 24 and then through the power turbine 26 that is connected by the gearbox to the propellers 22 and 24 that provide the major fraction of the thrust generated by the turbine engine. The combustion gas leaving the turbines is expelled via a nozzle 46 in order to increase the thrust.

Incorporating a step-down gearbox 38 makes it possible to have a power turbine 26 operating at high speed, at the order of 7000 revolutions per minute (rpm) to 8000 rpm, thereby making high efficiency possible and enabling the contrarotating propellers 12 and 14 to be rotated at low speed in order to limit sound nuisance.

Nevertheless, as can be seen in FIG. 1, that turbine engine architecture imposes an increase in axial size in order to be able to incorporate the contrarotating propellers 12 and 14 as well as the step-down gearbox 38, these elements being cantilevered out from the downstream portion of the turbine engine relative to the attachment point 48 where the turbine engine is attached to a portion of the airplane, and that gives rise to difficulties, as described above.

The invention provides a solution to those problems as well as to the problems mentioned above by incorporating a power turbine 50 between the upstream and downstream propellers 12 and 14, and by connecting this turbine via a step-down gearbox 52 to the upstream and downstream propellers 12 and 14.

For this purpose, the power turbine 50 comprises two contrarotating rotors on a common axis, namely an inner rotor 54 and an outer rotor 56, each comprising three rows of blades 58, 60 that are arranged in alternation with one another.

The outer rotor 56 is constrained to rotate with the upstream propeller 12. The inner rotor is connected to an inlet shaft 62 of the step-down gearbox 52 which has two outlet shafts 64 and 66, one of which, the shaft 64, is connected to the rotor of the upstream propeller 12, and the other of which, the shaft 66, is connected to the shaft driving the downstream propeller 14. The outlet shafts 64 and 66 from the step-down gearbox 52 rotate at speeds that are substantially equal but in opposite directions so as to drive the upstream and downstream propellers 12 and 14 in opposite directions.

The step-down gearbox 52 is mounted axially upstream from the upstream propeller 12 and radially inside a casing 168 separating the intermediate pressure turbine 24 from the power turbine 50, thereby further limiting the axial size of the turbine engine.

With the configuration of the invention, the inner rotor 54 may rotate at high speed since it is not connected directly to either of the propellers 12 and 14, thereby achieving good efficiency for the power turbine 50 which can be implemented using a small number of stages of moving blades 58 and 60.

Furthermore, the inner rotor 54 rotates at a speed that is slower than the speed of the rotor 30 of the power turbine 26 in FIG. 1 because of the rotation of the outer rotor 56 in the opposite direction, thereby enabling the weight of the inner rotor 54 to be reduced and increasing its mechanical strength in operation.

The connections between the rotors of the upstream propeller 12 and of the downstream propeller and the respective outlet shafts 64 and 66 of the gearbox 52 serve to limit the speed of the propellers 12 and 14 and thus limit sound nuisance.

The inner rotor 54 may rotate at a speed of about 6000 rpm to 7000 rpm, and the speed of the outlet shafts 64 and 66 from the gearbox 52 is of the order of 1000 rpm. These values make it possible to obtain a relative speed of the inner rotor 54 relative to the outer rotor 56 of the order of 7000 rpm to 8000 rpm, as in the prior art.

Figure 3:
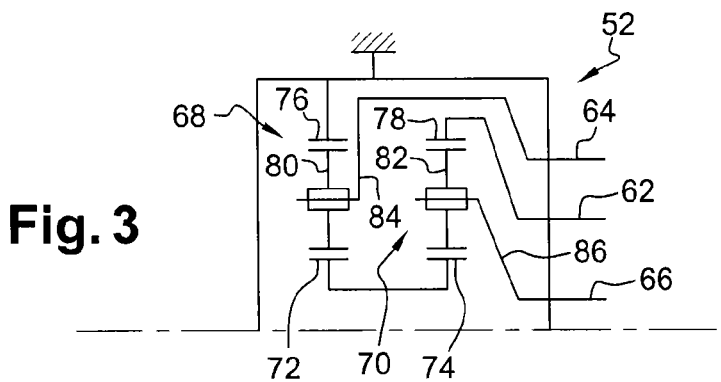
FIG. 3 is a schematic view of a gearbox of a turbine engine of the invention.

In a practical embodiment of the invention as shown in FIG. 3, the step-down gearbox 52 comprises two epicyclic gear sets 68 and 70, each comprising a sunwheel 72, 74, an outer ring 76, 78, and planet wheels 80, 82 meshing with the sunwheel 72, 74 and with the outer ring 76, 78, the planet wheels 80, 82 being mounted to rotate freely on respective planet carriers 84, 86. The two sunwheels 72, 74 are constrained to rotate with each other, and the outer ring 76 of the epicyclic gear set 68 is fastened to the casing of the turbine engine. The two outer rings 76 and 78, and likewise the planet wheels 80, 82, and also the sunwheels 72, 74 are of identical diameters. The outer ring 78 of the epicyclic gear set 70 is connected to the shaft 62 and to the inner rotor 54, the planet carrier 86 of this gear set being connected to the outlet shaft 66 driving the downstream propeller 14. The planet carrier 84 of the epicyclic gear set 68 is connected to the outlet shaft 64 driving the rotor 56 of the upstream propeller 12.

In general, the use of two epicyclic gear sets 68 and 70 makes it necessary to use means for transmitting torque from the inlet shaft 62 of one of the gear sets to the other gear set, with this transmission of torque possibly being implemented by constraining the sunwheels 72, 74 to rotate together (FIG. 3), or else the planet carriers 80 and 82, or indeed the outer rings 76 and 78. Amongst the elements (sunwheels, planet carriers, and outer rings) of the two epicyclic gear sets 68 and 70 that are not constrained to rotate together for torque transmission, one element is secured to a stationary portion of the turbine engine, one element is secured to the inlet shaft 62, one element is secured to the outlet shaft 64 driving the upstream propeller 12, and one element is connected to the outlet shaft 66 driving the downstream propeller 14.

The invention claimed is:

1. A turbine engine including two contrarotating unducted propellers of an upstream propeller and a downstream propeller, the engine comprising:
    a power turbine connected via a step-down gearbox to rotors of the propellers,
    wherein the power turbine is mounted axially between the two propellers, and
    wherein the power turbine comprises
        an outer rotor constrained to rotate with the upstream propeller, and
        an inner rotor driving rotation of an inlet shaft of the gearbox, the inner rotor and the outer rotor of the power turbine being interleaved, the gearbox having a first outlet shaft driving rotation of the rotor of the upstream propeller and a second outlet shaft driving rotation of the downstream propeller.

2. A turbine engine according to claim 1, wherein the gearbox is mounted axially upstream from the upstream propeller.

3. A turbine engine according to claim 1, wherein the power turbine comprises three stages in series, each stage including a first annular row of blades carried by the inner rotor and a second annular row of blades carried by the outer rotor.

4. A turbine engine according to claim 1, wherein the gearbox comprises first and second epicyclic gear sets in which sunwheels are constrained to rotate together and in which planet carriers drive the upstream and downstream propellers respectively, an outer ring of the first gear set being stationary and an outer ring of the second gear set being connected to the inlet shaft of the gearbox.

5. A turbine engine according to claim 1, wherein the inner rotor is not directly connected to the downstream propeller.

6. A turbine engine according to claim 1, wherein the gearbox has a gear ratio such that a rotating speed of the inlet shaft is greater than a rotating speed of the first outlet shaft and greater than a rotating speed of the second outlet shaft.

\* \* \* \* \*